(12) United States Patent
Yen et al.

(10) Patent No.: US 8,593,414 B2
(45) Date of Patent: Nov. 26, 2013

(54) OPTICAL TOUCH SYSTEM AND OPERATING METHOD THEREOF

(75) Inventors: Meng-Shin Yen, Taipei (TW); William Wang, Taoyuan (TW); Chung-Cheng Chou, Lujhu Township, Taoyuan County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 936 days.

(21) Appl. No.: 12/718,658

(22) Filed: Mar. 5, 2010

(65) Prior Publication Data
US 2010/0271307 A1 Oct. 28, 2010

(30) Foreign Application Priority Data
Apr. 28, 2009 (TW) .............................. 98114073 A (51) Int. Cl.
*G06F 3/041* (2006.01)
(52) U.S. Cl.
USPC ............................. 345/173; 345/156; 345/175

(58) Field of Classification Search
USPC .................................. 345/156, 169, 173–181
See application file for complete search history.

(56) References Cited

U.S. PATENT DOCUMENTS

| | | | |
|---|---|---|---|
| 7,432,893 B2* | 10/2008 | Ma et al. | 345/87 |
| 7,656,391 B2* | 2/2010 | Kimura et al. | 345/173 |
| 2005/0122318 A1* | 6/2005 | Tonouchi et al. | 345/179 |
| 2007/0268264 A1* | 11/2007 | Aarras et al. | 345/173 |
| 2008/0150903 A1* | 6/2008 | Chuang | 345/173 |
| 2009/0167702 A1* | 7/2009 | Nurmi | 345/173 |

\* cited by examiner

*Primary Examiner* — Duc Dinh (57) ABSTRACT

An optical touch system is disclosed. The optical touch system includes an optical touch apparatus, a control apparatus, and a rotating apparatus. When the control apparatus receives a mode switching signal, the control apparatus selects a corresponding specific using mode from a plurality of default using modes according to the mode switching signal. And, the specific using mode corresponds to a specific rotating angle. The rotating apparatus rotates the optical touch apparatus with the specific rotating angle to make the optical touch apparatus is rotated from a first location to a second location, so that a user can perform an input action via the optical touch apparatus according to the specific using mode.

16 Claims, 7 Drawing Sheets

OPTICAL TOUCH SYSTEM AND OPERATING METHOD THEREOF

BACKGROUND OF THE INVENTION

1. Field of the Invention

The present invention relates to a touch apparatus, and more particularly, to an optical touch system capable of rotating the optical touch apparatus from the upper side of the monitor to another suitable position via a rotation mechanism to provide the user different simulating input modes and the method thereof.

2. Description of the Prior Art

Recently, with the developing of image display related technology, there are various new types of display apparatus shown on the market to replace the conventional CRT monitor gradually. Wherein, the touch liquid crystal display has advantages such as power saving, smaller size, and inputting by touching directly, therefore, the touch liquid crystal display is popular to the ordinary consumers and becomes the main stream of the display market. The touch liquid crystal display is widely used in various types of electronic products, for example, an Automated Teller Machine (ATM), a point-of-sale (POS) terminal, a visitor navigation system, or an industrial controlling system.

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus.

However, the conventional optical touch apparatus must comprise many light source emitters and light receivers set around the panel to detect touch points, therefore, additional space requirement of the entire panel apparatus is caused, so that the volume of the conventional optical touch apparatus can not be reduced, the manufacturing cost will be also huge, and the conventional optical touch apparatus also fails to achieve touch point detection with high resolution. Recently, the triangulation measurement method is applied to the optical touch technology to detect the touch points. In this way, the touch inputting resolution can be enhanced and the amount of the light emitters and the light receivers can be reduced, however, not only the problem of additional space requirement can not be solved, but also some new problems such as complicated calculations and the reflector of the border should be positioned precisely are occurred.

Figure 1:
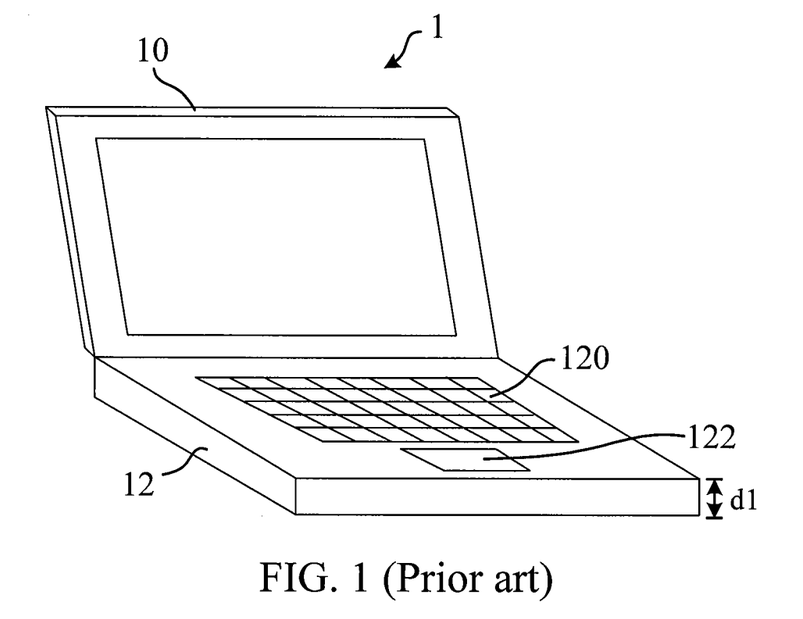
FIG. 1 illustrates a scheme diagram of the keyboard and the touch pad set on the base of the conventional notebook.

In addition, because the rapid development of technology and the practical needs of the busy modern life, the 3C products on the market should be small in size and easy to be carried. Therefore, even the electronic product has certain excellent function, if it is heavy and not easy to be carried, it is hard to be popular in ordinary consumers. Taking the notebook which is more and more popular in recent years for example, the notebook has become small, thin, and easy to be carried. However, as shown in FIG. 1, input units such as keyboard 120 and touch pad 122 are still necessary to be set on the base 12 of the conventional notebook 1 for the user to input, therefore, it is hard to reduce the thickness d1 of the base 12, and it will become a huge obstacle to the development of the ultra-thin notebook.

Therefore, the invention provides an optical touch system and operating method thereof to solve the aforementioned problems.

SUMMARY OF THE INVENTION

The invention provides an optical touch system capable of rotating the optical touch apparatus from the upper side of the monitor to another suitable position via a rotation mechanism to provide the user different simulating input modes and the method thereof. Because the rotated optical touch apparatus can replace the function of the input unit (e.g., keyboard or touch pad) originally set on the base of the notebook, so that the volume of the base of the notebook can be reduced, and the thickness of the entire notebook can be also reduced.

A first embodiment of the invention is an optical touch system. In this embodiment, the optical touch system includes an optical touch apparatus, a control apparatus, and a rotating apparatus. Wherein, the rotating apparatus is coupled to the optical touch apparatus and the control apparatus respectively. When the control apparatus receives a mode switching signal, the control apparatus selects a corresponding specific using mode from a plurality of default using modes according to the mode switching signal, and the specific using mode corresponds to a specific rotating angle. The rotating apparatus rotating the optical touch apparatus with the specific rotating angle to make the optical touch apparatus rotated from a first location to a second location for a user to perform an input action via the optical touch apparatus according to the specific using mode.

The second embodiment of the invention is an optical touch system operating method. In this embodiment, the optical touch system includes an optical touch apparatus, a control apparatus, and a rotating apparatus. The method includes the following steps of: (a) when the control apparatus receives a mode switching signal, the control apparatus selecting a corresponding specific using mode from a plurality of default using modes according to the mode switching signal, wherein the specific using mode corresponds to a specific rotating angle; (b) the rotating apparatus rotating the optical touch apparatus with the specific rotating angle to make the optical touch apparatus rotated from a first location to a second location for a user to perform an input action via the optical touch apparatus according to the specific using mode.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

The optical touch system and operating method thereof can rotate the optical touch apparatus from the upper side of the monitor to another suitable position via a rotation mechanism to provide the user different simulating input modes. It should be noticed that since the rotated optical touch apparatus can replace the function of the input unit (e.g., keyboard or touch pad) originally set on the base of the notebook, so that the volume of the base of the notebook can be reduced, and the thickness of the entire notebook can be also reduced.

Figure 2:
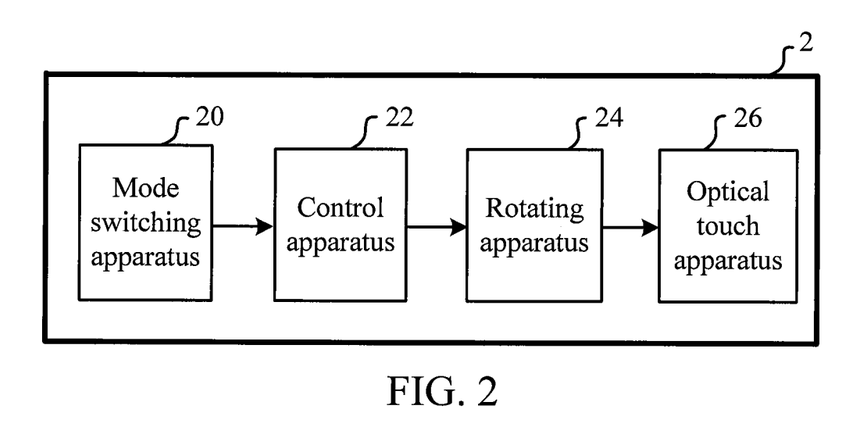
FIG. 2 illustrates a functional block diagram of the optical touch system in the first embodiment of the invention.

A first embodiment of the invention is an optical touch system. In this embodiment, the optical touch system can be applied to the notebook and other information processing apparatus, and have the functions of touch input and simulating different input apparatuses (e.g., keyboard, touch pad, hand writing pad, and joystick). Please refer to FIG. 2. FIG. 2 shows the functional block diagram of the optical touch system.

As shown in FIG. 2, the optical touch system 2 includes a mode switching apparatus 20, a control apparatus 22, a rotating apparatus 24, and an optical touch apparatus 26. Wherein, the mode switching apparatus 20 is coupled to the control apparatus 22; the control apparatus 22 is coupled to the rotating apparatus 24; the rotating apparatus 24 is coupled to the optical touch apparatus 26. If the optical touch system 2 is applied to a notebook, under a normal monitor touch mode, the optical touch apparatus 26 is set around the monitor of the notebook, and the monitor can have the touch input function through an optical sensing way.

Figure 3A:
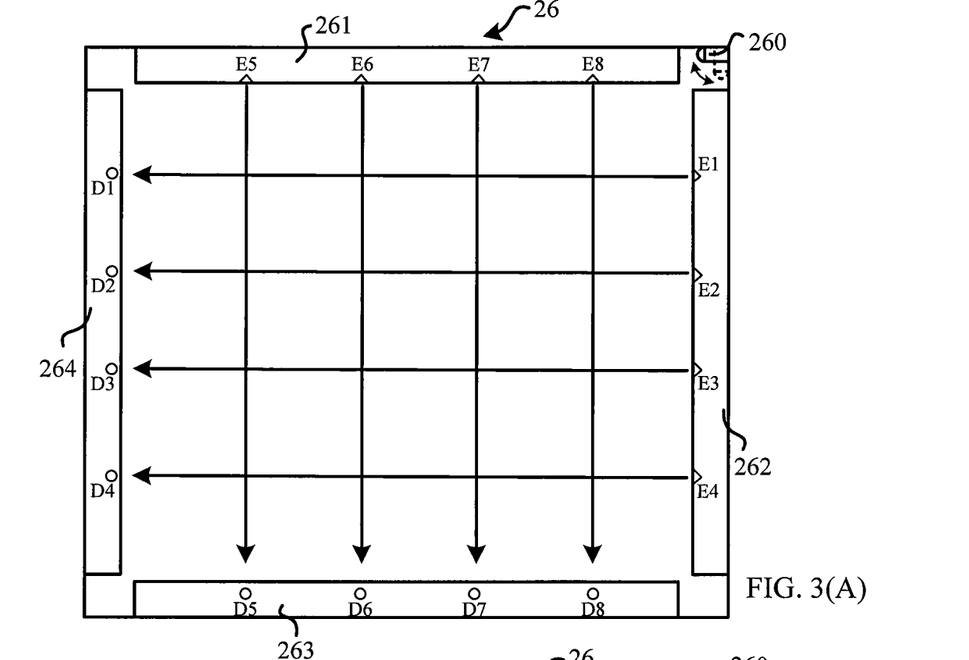
FIG. 3(A) illustrates a scheme diagram of the optical touch apparatus set around the monitor of the notebook.

Please refer to FIG. 3(A). FIG. 3(A) shows the scheme diagram of the optical touch apparatus 26 set around the monitor of the notebook. As shown in FIG. 3(A), the optical touch apparatus 26 includes a rotational light source emitting module 260, a first optical module 261, a second optical module 262, a first light sensing module 263, a second light sensing module 264, and a processing module (not shown in the figure). The rotational light source emitting module 260 emits a first light source and a second light source to the first optical module 261 and the second optical module 262 respectively. The first optical module 261 and the first light sensing module 263 are set at a first side of a surface of the monitor and a second side opposite to the first side respectively; the second optical module 262 and the second light sensing module 264 are set at a third side of the surface of the monitor and a fourth side opposite to the third side respectively. The first optical module 261 includes four first light guiding units E5~E8 and the second optical module 262 includes four second light guiding units E1~E4. Wherein, the first light guiding units E5~E8 emit parallel first direction lights $L_{x1}$~$L_{x4}$ respectively; the second light guiding units E1~E4 emit parallel second direction lights $L_{y1}$~$L_{y4}$ respectively. The first light sensing module 263 includes four first photoelectric sensing units D5~D8; the second light sensing module 264 includes four second photoelectric sensing units D1~D4.

Figure 3B:
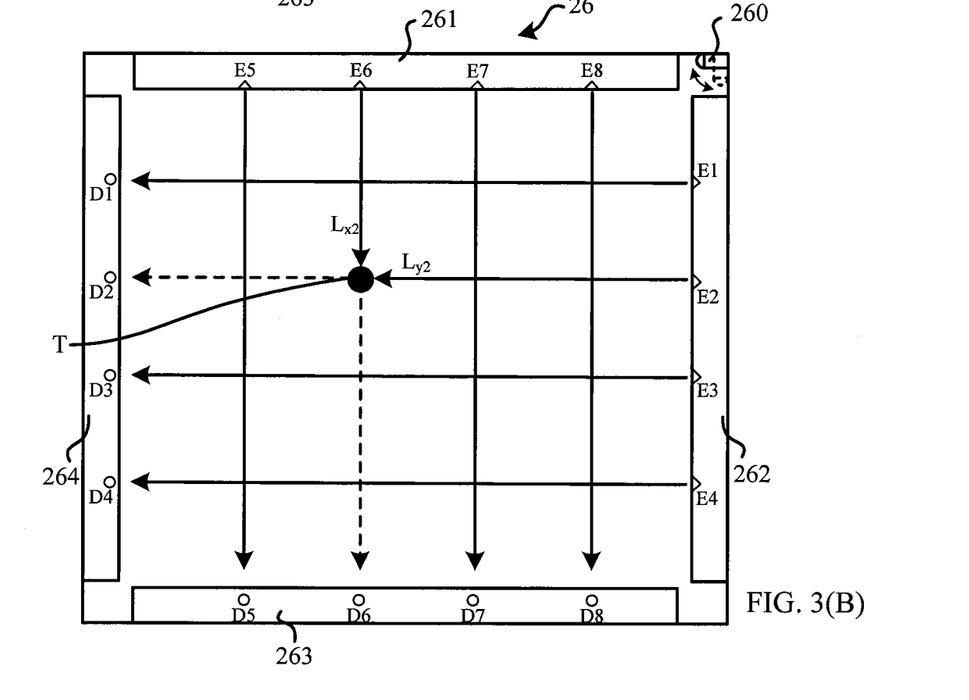
FIG. 3(B) illustrates a scheme diagram of the optical touch apparatus sensing the touch point T under the normal monitor touch mode.

Please refer to FIG. 3(B). FIG. 3(B) illustrates a scheme diagram of the optical touch apparatus 26 sensing the touch point T under the normal monitor touch mode. In fact, the touch point T can be formed by any objects, such as fingers, touch pens, and once the object blocks the lights above the surface of the monitor, the touch point T can be formed even without touching the surface of the monitor. As shown in FIG. 3(B), the first light sensing module 263 and the second light sensing module 264 will generate a first sensing result and a second sensing result based on whether the first photoelectric sensing units D5~D8 and the second photoelectric sensing units D1~D4 receive the first direction lights and the second direction lights respectively.

Then, the processing module of the optical touch apparatus 26 can obtain the information that the first photoelectric sensing unit D6 and the second photoelectric sensing unit D2 fail to receive lights according to the first sensing result and the second sensing result, and find out that the first light guiding unit E6 and the horizontal axis coordinate $X_2$ correspond to the first photoelectric sensing unit D6, and the second light guiding unit E2 and the vertical axis coordinate $Y_2$ correspond to the second photoelectric sensing unit D2. Therefore, the processing module can determine the 2-D coordinates of the touch point formed by the object on the surface of the monitor should be $(X_2, Y_2)$ according to the above-mentioned information.

The condition of the optical touch apparatus 26 sensing the touch point T under the normal monitor touch mode is mentioned above. In fact, under some special monitor touch conditions, the rotational light source emitting module 260 not only emits the first light source and the second light source to the first optical module 261 and the second optical module 262 respectively, but also can sequentially emit a plurality of scanning lights, and the plurality of scanning lights is uniformly distributed above the surface. The first light sensing module 263 and the second light sensing module 264 receive the plurality of scanning lights and generate a third sensing result and a fourth sensing result based on the condition of receiving the plurality of scanning lights respectively. Then, the processing module will determine the touch point position on the surface based on the first sensing result, the second sensing result, the third sensing result, and the fourth sensing result.

In this embodiment, when the user does not want to continue to use the ordinary monitor touch mode, and wants to use the optical touch apparatus 26 to perform other input modes, the user can use his/her finger or touch pen to push or touch the mode switching apparatus 20. When the mode switching apparatus 20 is pushed or touched, the mode switching apparatus 20 will generate a mode switching signal and send it to the control module 22.

Figure 4A:
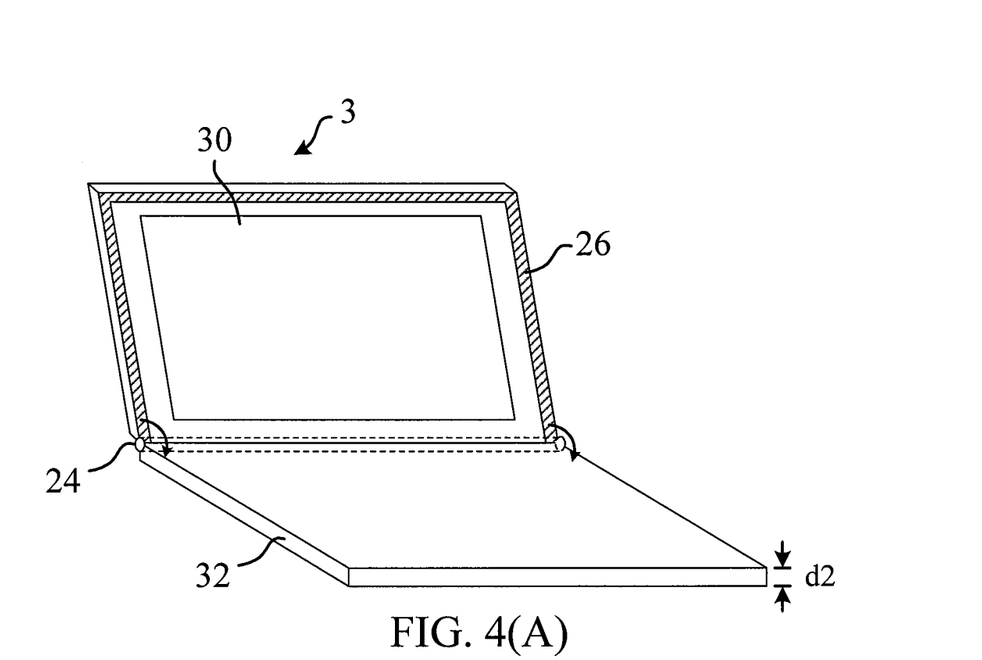
FIG. 4(A) and FIG. 4(B) illustrate scheme diagrams of the rotating apparatus rotating the optical touch apparatus from the first position to the second position based on the specific rotating angle.
Figure 4B:
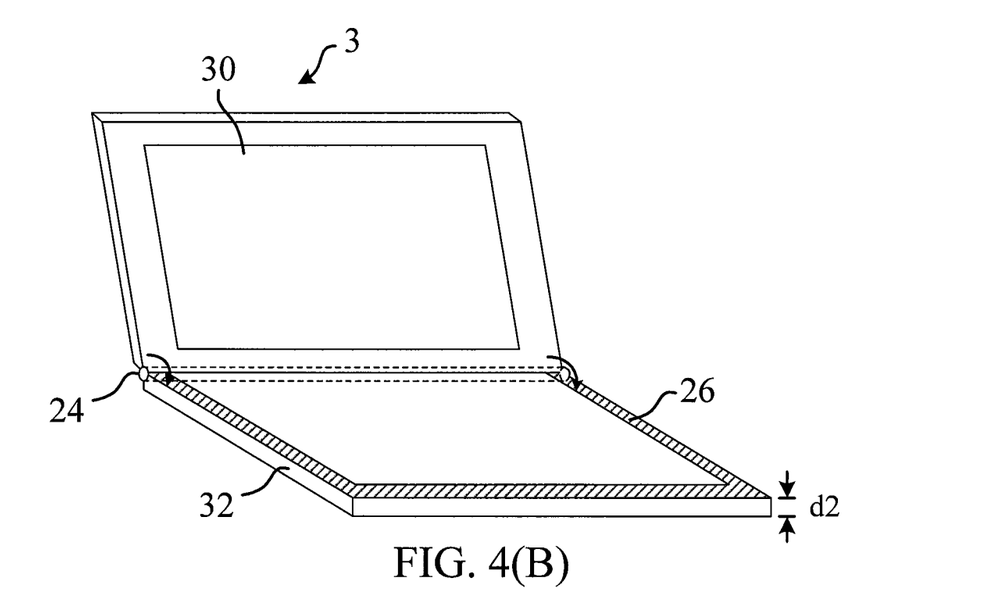

When the control apparatus 22 receives the mode switching signal, the control apparatus 22 will select a corresponding specific using mode from a plurality of default using modes based on the mode switching signal, and the specific using mode corresponds to a specific rotating angle. For example, the plurality of default using modes include a keyboard simulating input mode, a touch pad/hand writing pad simulating input mode, and a joystick simulating input mode, if the user wants to select the keyboard simulating input mode, then the specific using mode selected by the control apparatus 22 is the keyboard simulating input mode, and the specific rotating angle corresponding to the keyboard simulating input mode is rotated from the first position (e.g., the upper side of the monitor of the notebook 3) to the second position (e.g., the upper side of the base 32 of the notebook 3)

using the rotating apparatus 24 (e.g., pivoting axis or other devices with rotating function) as the center, as shown in FIG. 4(A)~(B).

Next, the rotating apparatus 24 will rotate the optical touch apparatus 26 from the first position to the second position based on the specific rotating angle, so that the user can input via the optical touch apparatus based on the specific using mode, and the conditions before and after the rotation are shown in FIG. 4(A)~(B). It should be noticed that the thickness d2 of the base 32 of the notebook 3 shown in FIG. 4(B) is small than the thickness d1 of the base 12 of the conventional notebook 1 shown in FIG. 1. This is because the optical touch apparatus 26 and the rotating apparatus 24 of the invention is used in the notebook 3, so that the keyboard 120 and the touch pad 122 are not necessary to be set on the base 32 of the notebook 3, therefore, the space of setting keys, touch pads, and complicated circuit board structure can be saved to reduce the thickness of the base from d1 to d2.

Figure 5:
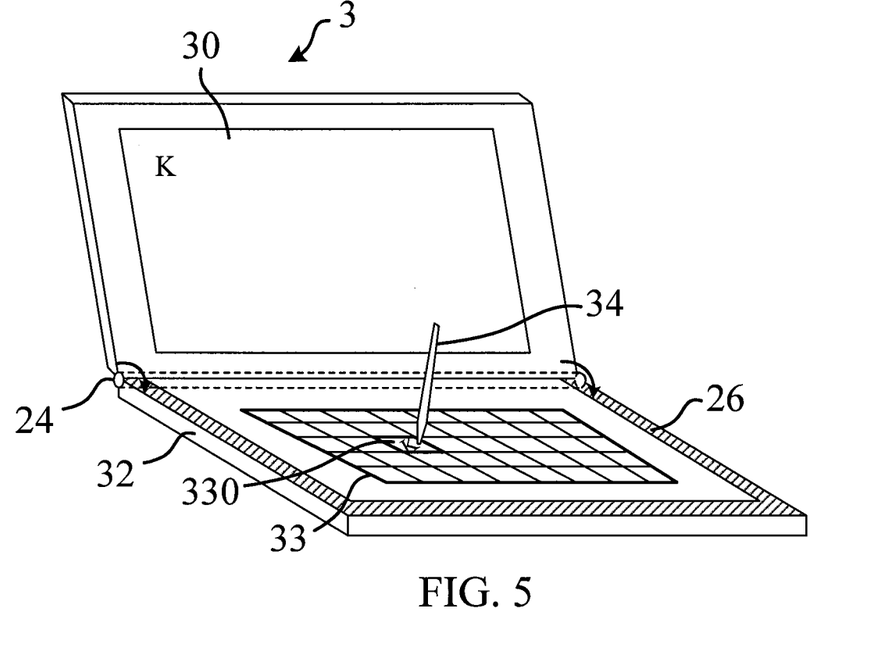
FIG. 5 illustrates an example of operating the optical touch apparatus under the keyboard simulating input mode.

Please refer to FIG. 5. FIG. 5 illustrates an example of operating the optical touch apparatus 26 under the keyboard simulating input mode. As shown in FIG. 5, if an inputting area 33 is set on the base 32 and the inputting area 33 includes a plurality of sub-inputting areas, wherein the first sub-inputting area 330 corresponds to the first keyboard key K. When the touch pen 34 approaches or touches the first sub-inputting area 330, the optical touch apparatus 26 will detect the first sub-inputting area 330 approached or touched by the touch pen 34 through the way similar to FIG. 3(B). Since the first sub-inputting area 330 corresponds to the first keyboard key K, that is to say, the user wants to push the keyboard key K, therefore, the monitor 30 of the notebook 3 will show "K".

In practical applications, after the optical touch apparatus 26 finishes the determination of the position of the touch point, the optical touch apparatus 26 will find out a function, a character, or a symbol corresponding to the sub-inputting area based on a look-up table, and perform the function or show the character or symbol on the monitor 30. In fact, the corresponding relationships between the sub-inputting area and these function, character, or symbol can be system default value or set by the user without any limitations.

Figure 6:
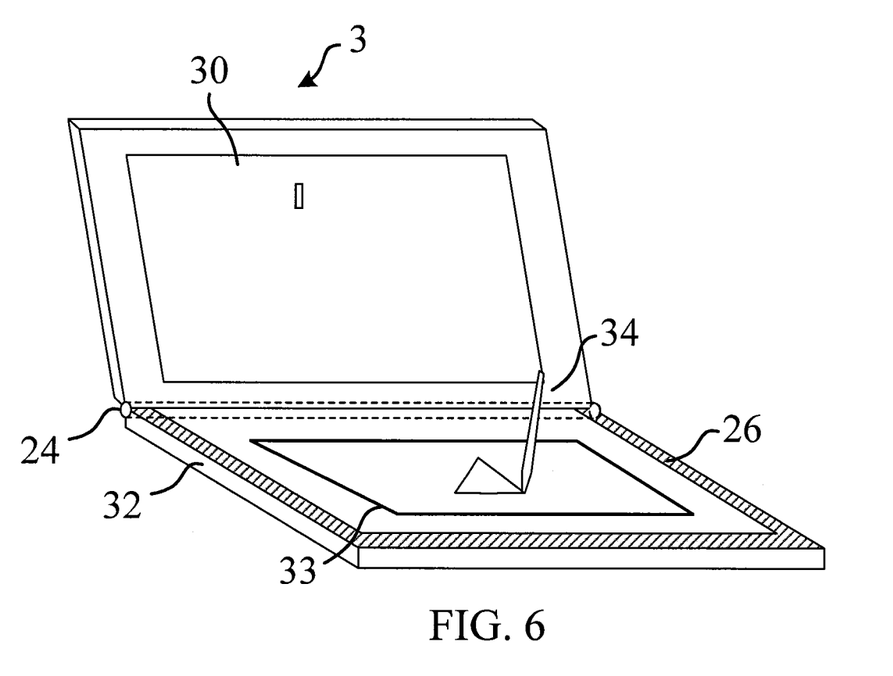
FIG. 6 illustrates an example of operating the optical touch apparatus under the touch pad/hand writing pad input mode.

Additionally, the condition of operating the optical touch apparatus 26 under the touch pad/hand writing pad simulating input mode is similar to that under the above-mentioned keyboard simulating input mode, the inputting area 33 is also set on the base 32 and used for finger or touch pen to approach or touch the inputting area 33 to perform the action of hand writing input or function selection. For example, as shown in FIG. 6, the user can use the touch pen 34 to write a "□" in the inputting area 33, the optical touch apparatus 26 will generate an optical detecting result and send it to the notebook 3, then the notebook 3 will perform the operations based on the detecting result to determine the symbol "□" and show the symbol "□" on the monitor 30.

Figure 7A:
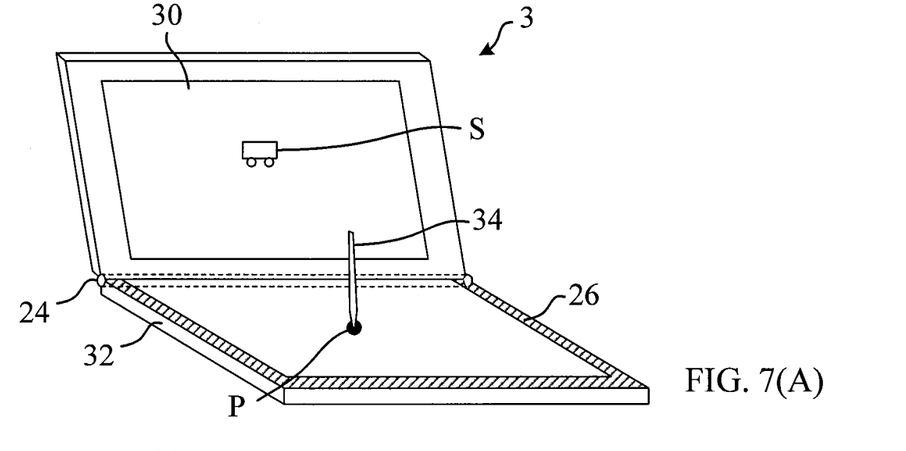
FIG. 7(A)~FIG. 7(C) illustrate scheme diagrams of the touch pen set on the positioning point P and the touch pen further using the positioning point P as the fulcrum to tilt a certain angle leftward or rightward.
Figure 7B:
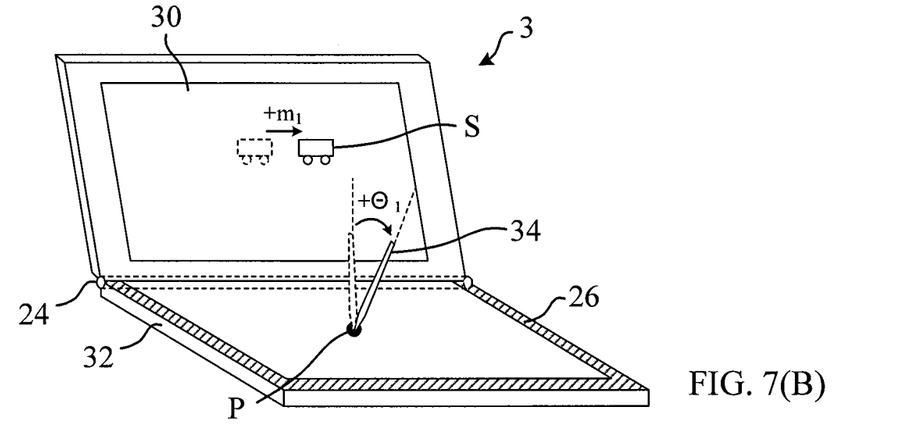
Figure 7C:
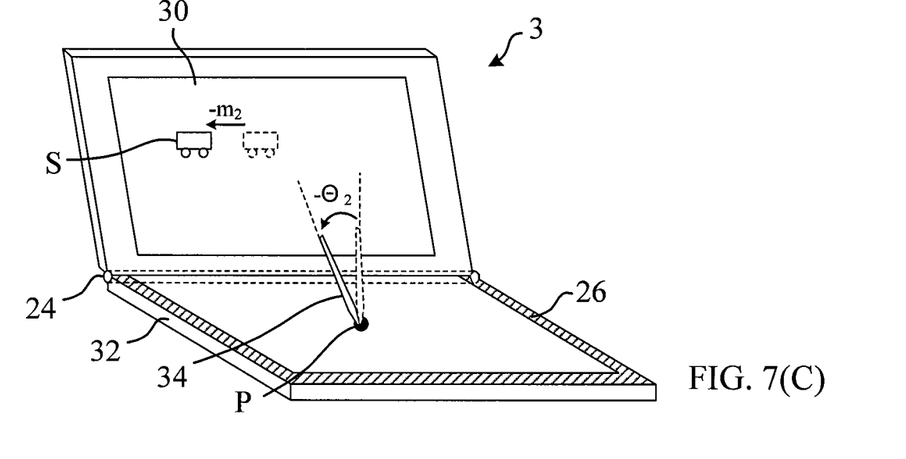
Figure 8A:
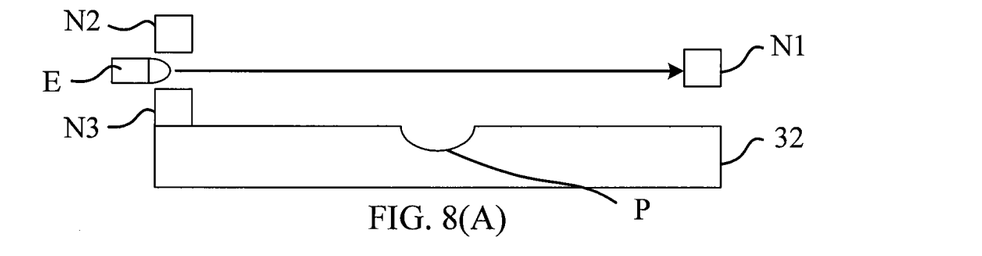
FIG. 8(A)~FIG. 8(D) illustrate scheme diagrams of the light sensing modules set on the same side of the light source emitting module of the optical touch apparatus to judge the rotating angle of the touch object.
Figure 8B:
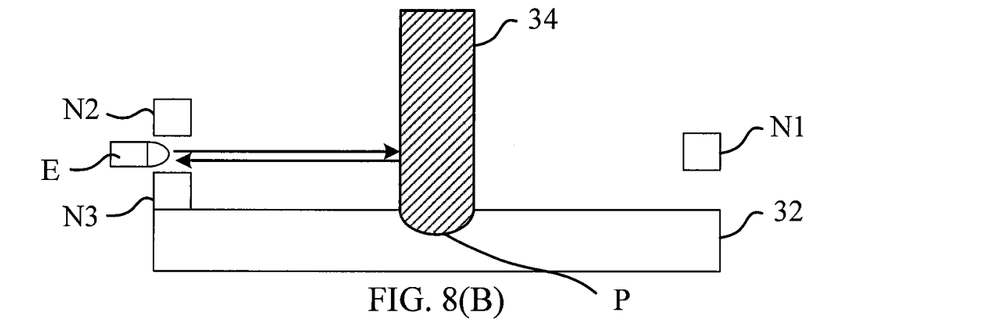
Figure 8C:
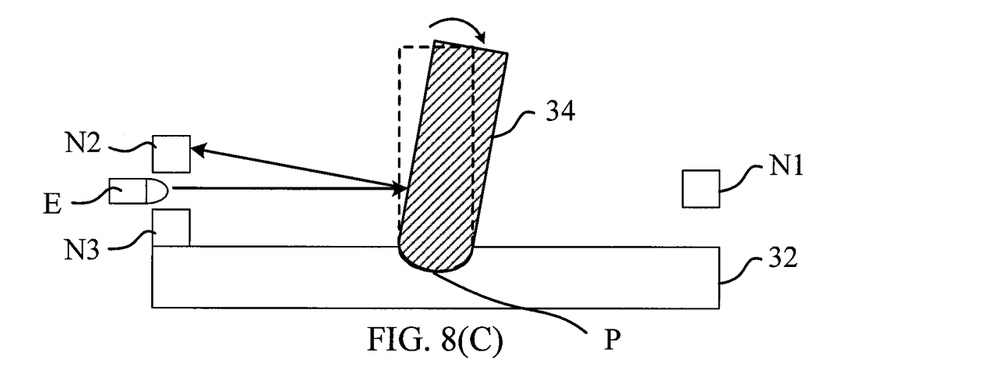
Figure 8D:
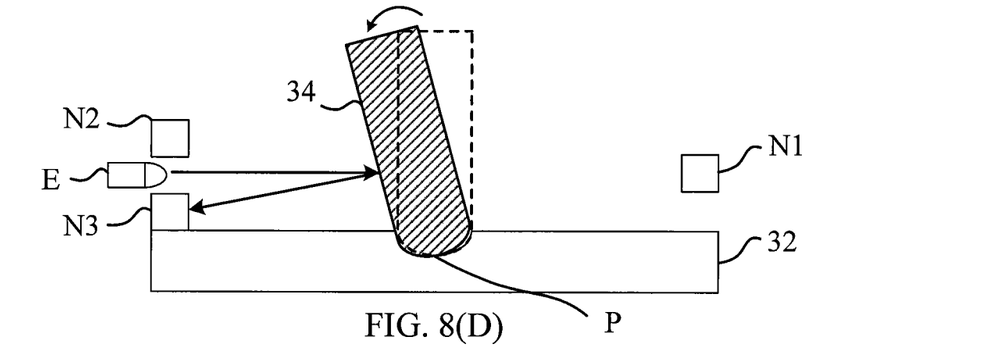

The condition of operating the optical touch apparatus 26 under the joystick simulating input mode will be more complicated than the above-mentioned two conditions. Please refer to FIG. 7(A)~7(C). FIG. 7(A)~FIG. 7(C) illustrate scheme diagrams of the touch pen 34 set on the positioning point P and the touch pen 34 further using the positioning point P as the fulcrum to tilt a certain angle leftward or rightward. As shown in FIG. 7(A), the positioning point P is set on the base 32 of the notebook 3. In fact, the positioning point P can have a recess part, so that the touch pen 34 or other objects can against the recess part as the fulcrum to rotate. When the user uses the tip of the touch pen 34 vertical to the base 32 to approach or touch the positioning point P, the optical touch apparatus 26 will start the joystick simulating input mode.

If the item S currently shown on the monitor 30 is controlled by the simulated joystick, as shown in FIG. 7(B), when the user uses the tip of the touch pen 34 as the fulcrum and tilts the touch pen 34 with an angle $\theta_1$ rightward from the direction vertical to the base 32, the item S shown on the monitor 30 will move a distance $m_1$ rightward from the original position, and the distance $m_1$ corresponds to the tilting angle $\theta_1$. Similarly, as shown in FIG. 7(C), when the user uses the tip of the touch pen 34 as the fulcrum and tilts the touch pen 34 with an angle $\theta_2$ leftward from the direction vertical to the base 32, the item S shown on the monitor 30 will move a distance $m_2$ leftward from the original position, and the distance $m_2$ corresponds to the tilting angle $\theta_2$. In fact, the corresponding relationships between the tilting angles $\theta_1$, $\theta_2$ and the distances $m_1$, $m_2$ can be system default value or set by the user without any limitations. In the same way, if the touch pen 34 tilts an angle from the original direction vertical to the base 32 toward the direction approaching or far away from the monitor, the item S shown on the monitor 30 will also move a distance corresponding to the angle from the original position upward or downward.

In this embodiment, when the tip of the touch pen 34 approaches or touches the positioning point P, the optical touch apparatus 26 actually senses a plurality of tilting angles of the touch pen generated under different times, and determines a rotating angle and a rotating direction of the touch pen 34 based on these tilting angles. Then, the optical touch apparatus 26 will provide these information of rotating angle and direction to the notebook 3, so that the notebook 3 can control the movement of the item S shown on the monitor 30 based on an item moving distance and direction corresponding to the rotating angle and direction. By doing so, the user can achieve the function of simulating the control of the joystick.

It should be noticed that under the joystick simulating input mode, the optical touch apparatus 26 must position the rotating angle of the touch object, therefore, the optical touch apparatus 26 includes not only the light sensing module N1 set opposite to the light source emitting module E, but also the light sensing modules N2 and N3 set on the same side of the light source emitting module, so that the rotating angle of the touch object can be smoothly determined, as shown in FIG. 8(A)~(D). In addition, in this invention, some special patterned surface processes (e.g., partially transparent process) can be done to the surface of the touch pen 34 or some special changes of the shape of the touch pen 34 (e.g., the form of circle, rectangle, octagonal, recess part or convex part of different types, etc.) can be done to enhance the accuracy of the tilting angle of the touch pen 34 calculated by the optical touch apparatus 26.

It should be noticed that the above-mentioned optical touch system 2 is only an example of automatically rotating according to the mode switching signal, in practical applications, the optical touch system 2 can also have other operating conditions. For example, the user can switch different using modes through his/her hands. If the optical touch apparatus 26 is originally set around the monitor of the notebook, and the optical touch apparatus 26 corresponds to the ordinary monitor touch input mode, when the user moves the optical touch apparatus 26 from the position around the monitor to the position on the base of the notebook through his/her hands, the control apparatus 22 can determine that the user wants to convert the current using mode to another using mode (e.g., the keyboard simulating input mode), so that the control apparatus 22 will automatically convert the using mode of the optical touch apparatus 26 to the keyboard simulating input mode for the user to input. Above all, it can be found that the optical touch system 2 of the invention can be operated by hands or automatically without any limitations.

Figure 9:
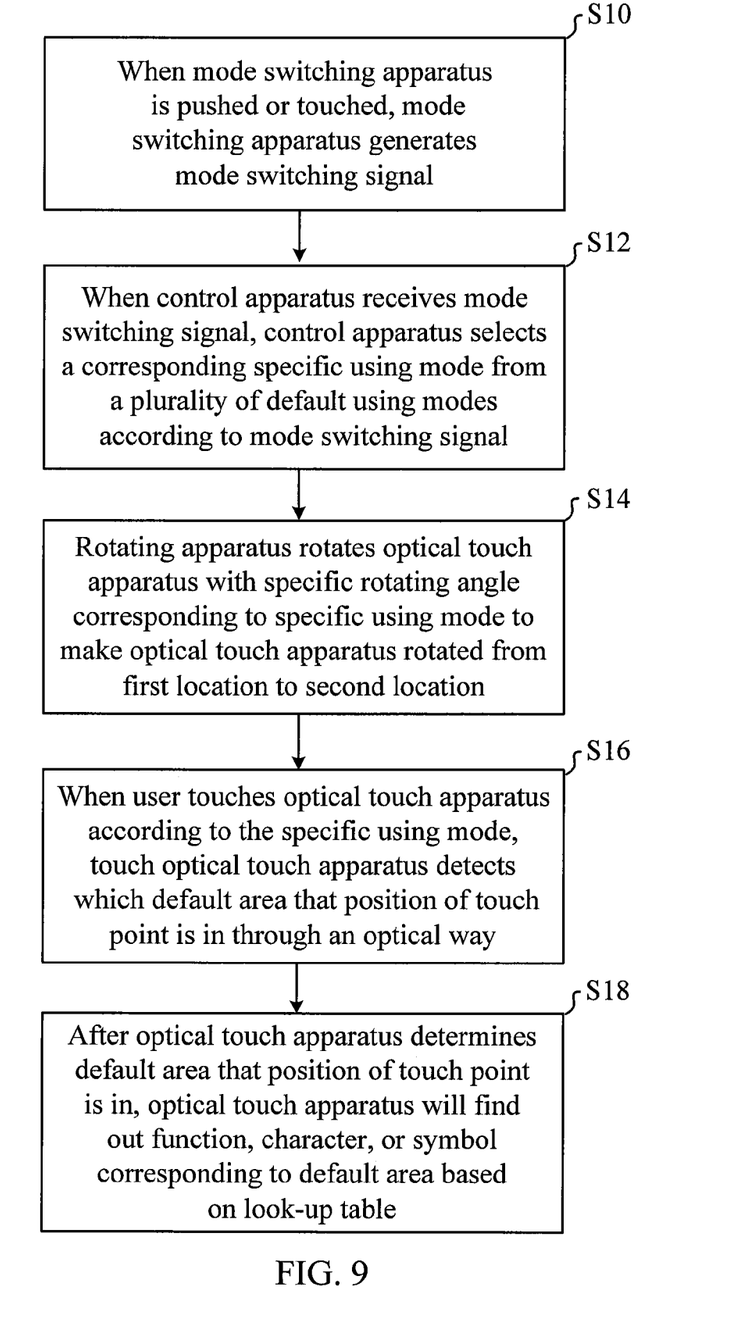
FIG. 9 illustrates the flowchart of the optical touch system operating method in the second embodiment of the invention.

The second embodiment of the invention is an optical touch system operating method. In this embodiment, the optical touch system includes a mode switching apparatus, an optical touch apparatus, a control apparatus, and a rotating apparatus. Please refer to FIG. 9. FIG. 9 shows the flowchart of the optical touch system operating method. As shown in FIG. 9, in step S10, when the mode switching apparatus is pushed or touched, the mode switching apparatus generates a mode switching signal. Then, in step S12, when the control apparatus receives the mode switching signal, the control apparatus selects a corresponding specific using mode from a plurality of default using modes according to the mode switching signal, wherein the specific using mode corresponds to a specific rotating angle. In fact, the default using modes includes a keyboard simulating input mode, a touch pad/hand writing pad simulating input mode, or a joystick simulating input mode, but not limited to these cases.

Then, in step S14, the rotating apparatus rotates the optical touch apparatus with a specific rotating angle to make the optical touch apparatus rotated from a first location to a second location. In step S16, when the user touches the optical touch apparatus according to the specific using mode, the touch optical touch apparatus detects which default area that the position of the touch point is in through an optical way. In step S18, after the optical touch apparatus determines the default area that the position of the touch point is in, the optical touch apparatus will find out a function, a character, or a symbol corresponding to the default area based on a look-up table. In addition, the optical touch apparatus can further perform the function or show the character or the symbol on the monitor of the information processing apparatus. As to the detailed operating conditions of the optical touch apparatus, since they are already shown in the related description and figures of the first embodiment, so that they are not described again here.

Compared to prior arts, the optical touch system and operating method thereof can rotate the optical touch apparatus from the upper side of the monitor to another suitable position via a rotation mechanism to provide the user different simulating input modes. The user can switch the using mode and simulate the functions of the input apparatuses such as the keyboard, the touch pad, and the joystick through the touch method. It should be noticed that since the rotated optical touch apparatus can replace the function of the input unit originally set on the base of the notebook, so that the volume of the base of the notebook can be reduced, and the thickness of the entire notebook can be also reduced.

Although the present invention has been illustrated and described with reference to the preferred embodiment thereof, it should be understood that it is in no way limited to the details of such embodiment but is capable of numerous modifications within the scope of the appended claims.

What is claimed is:
1. An optical touch system, comprising:
    an optical touch apparatus including:
        a first optical module set at a first side of a surface of the optical touch apparatus, the first optical module receives a first light source and uniformly emits a plurality of first direction lights, when at least one first direction light of the plurality of first direction lights is blocked by an object above the surface, the first light sensing module generates a first sensing result based on the condition of receiving the plurality of first direction lights;
        a second optical module set at a third side of the surface of the optical touch apparatus, the second optical module receives a second light source and uniformly emits a plurality of second direction lights, when at least one second direction light of the plurality of second direction lights is blocked by the object, the second light sensing module will generate a second sensing result based on the condition of receiving the plurality of second direction lights;
        a rotational light source emitting module for emitting the first light source and the second light source to the first optical module and the second optical module respectively, wherein the rotational light source emitting module also sequentially emits a plurality of scanning lights, the plurality of scanning lights is uniformly distributed above the surface;
        a first light sensing module set at a second side opposite to the first side, wherein the first light sensing module generates a first sensing result based on the condition of receiving the plurality of first direction lights when at least one first direction light of the plurality of first direction lights is blocked by an object above the surface, and the first light sensing module receives the plurality of scanning lights and generates a third sensing result based on the condition of receiving the plurality of scanning lights;
        a second light sensing module set at a fourth side opposite to the third side, wherein the second light sensing module generates a second sensing result based on the condition of receiving the plurality of second direction lights when at least one second direction light of the plurality of second direction lights is blocked by the object above the surface, and the second light sensing module receives the plurality of scanning lights and generates a fourth sensing result based on the condition of receiving the plurality of scanning lights;
        a processing module determines a touch point position corresponding to the object on the surface based on the first sensing result, the second sensing result, the third sensing result, and the fourth sensing result; and
    a control apparatus, when the control apparatus receives a mode switching signal, the control apparatus selecting a corresponding specific using mode from a plurality of default using modes according to the mode switching signal, wherein the specific using mode corresponds to a specific rotating angle; and
    a rotating apparatus, coupled to the optical touch apparatus and the control apparatus, the rotating apparatus rotating the optical touch apparatus with the specific rotating angle to make the optical touch apparatus rotated from a first location to a second location for a user to perform an input action via the optical touch apparatus according to the specific using mode.
2. The optical touch system of claim 1, further comprising:
    a mode switching module, coupled to the control apparatus, when the mode switching module is pushed or touched, the mode switching module generating the mode switching signal to the control module.
3. The optical touch system of claim 1, wherein the specific using mode is a keyboard simulating input mode, a touch pad/hand writing pad simulating input mode, or a joystick simulating input mode.

4. The optical touch system of claim 3, wherein when the specific using mode is the keyboard simulating input mode, the second position is on a base of an information processing apparatus, an inputting area is set on the base, the inputting area comprises a plurality of sub-inputting areas, when an object approaches or touches a first sub-inputting area of the plurality of sub-inputting areas, if the first sub-inputting area corresponds to a first keyboard key, the information processing apparatus will show a character, a symbol, or a function corresponding to the first keyboard key.

5. The optical touch system of claim 3, wherein when the specific using mode is the touch pad/hand writing pad simulating input mode, the second position is on a base of an information processing apparatus, an inputting area is set on the base and used for an object to approach or touch the inputting area to perform hand writing input or function selection.

6. The optical touch system of claim 3, wherein when the specific using mode is the joystick simulating input mode, the second position is on a base of an information processing apparatus, a positioning point is set on the base, when an object approaches or touches the positioning point, the optical touch apparatus starts to sense a plurality of tilting angles of the object under different times and determine a rotating angle and a rotating direction of the object according to the plurality of tilting angles, an item shown by the information processing apparatus will perform corresponding movement according to the rotating angle and the rotating direction.

7. The optical touch system of claim 1, wherein the optical touch apparatus comprises an emitting module and a receiving module, the emitting module and the receiving module are set at a first side of a surface of the optical touch apparatus and a second side opposite to the first side respectively, the emitting module is used for uniformly emitting a plurality of lights, the receiving module is used for receiving the plurality of lights, at least one partial area of the emitting module and/or the receiving module is composed of an optical unit with light guiding function.

8. The optical touch system of claim 1, wherein the first optical module comprises a plurality of light guiding units, the first light sensing module comprises a plurality of photoelectric sensing units, a first photoelectric sensing unit of the plurality of photoelectric sensing units corresponds to a first light guiding unit of the plurality of light guiding units and a first position, and the first photoelectric sensing unit is used for receiving a first direction light emitted from the first light guiding unit.

9. The optical touch system of claim 1, wherein after the processing module determines the touch point position, the processing module will find out a specific function corresponding to the touch point position based on a look-up table and perform the specific function.

10. A method of operating an optical touch system, the optical touch system comprising an optical touch apparatus, a control apparatus, and a rotating apparatus, wherein the optical touch apparatus comprises a first optical module, a first light sensing module, a second optical module, a second light sensing module, a rotational light source emitting module, and a processing module, the first optical module and the first light sensing module are set at a first side of a surface of the optical touch apparatus and a second side opposite to the first side respectively while the second optical module and the second light sensing module are set at a third side of the surface and a fourth side opposite to the third side respectively, the first optical module receives a first light source and uniformly emits a plurality of first direction lights and the second optical receives a second light source and uniformly emits a plurality of second direction lights, the rotational light source emitting module emits the first light source and the second light source to the first optical module and the second optical module respectively and also sequentially emits a plurality of scanning lights where the plurality of scanning lights is uniformly distributed above the surface, the first light sensing module generates a first sensing result based on the condition of receiving the plurality of first direction lights when at least one first direction light of the plurality of first direction lights is blocked by an object above the surface, the second sensing module generates a second sensing result based on the condition of receiving the plurality of second direction lights when at least one second direction light of the plurality of second direction lights is blocked by the object, the first light sensing module and the second light sensing module receive the plurality of scanning lights and generate a third sensing result and a fourth sensing result based on the condition of receiving the plurality of scanning lights, the processing module determines a touch point corresponding to the object on the surface based on the first sensing result, the second sensing result, the third sensing result, and the fourth sensing result, the method comprising the steps of:

when the control apparatus receives a mode switching signal, the control apparatus selecting a corresponding specific using mode from a plurality of default using modes according to the mode switching signal, wherein the specific using mode corresponds to a specific rotating angle; and the rotating apparatus rotating the optical touch apparatus with the specific rotating angle to make the optical touch apparatus rotated from a first location to a second location for a user to perform an input action via the optical touch apparatus according to the specific using mode.

11. The method of claim 10, wherein the specific using mode is a keyboard simulating input mode, a touch pad/hand writing pad simulating input mode, or a joystick simulating input mode.

12. The method of claim 11, wherein when the specific using mode is the keyboard simulating input mode, the second position is on a base of an information processing apparatus, an inputting area is set on the base, the inputting area comprises a plurality of sub-inputting areas, when an object approaches or touches a first sub-inputting area of the plurality of sub-inputting areas, if the first sub-inputting area corresponds to a first keyboard key, the information processing apparatus will show a character, a symbol, or a function corresponding to the first keyboard key.

13. The method of claim 11, wherein when the specific using mode is the touch pad/hand writing pad simulating input mode, the second position is on a base of an information processing apparatus, an inputting area is set on the base and used for an object to approach or touch the inputting area to perform hand writing input or function selection.

14. The method of claim 11, wherein when the specific using mode is the joystick simulating input mode, the second position is on a base of an information processing apparatus, a positioning point is set on the base, when an object approaches or touches the positioning point, the optical touch apparatus starts to sense a plurality of tilting angles of the object under different times and determine a rotating angle and a rotating direction of the object according to the plurality of tilting angles, an item shown by the information processing apparatus will perform corresponding movement according to the rotating angle and the rotating direction.

15. The method of claim 10, wherein the optical touch apparatus comprises an emitting module and a receiving module, the emitting module and the receiving module are set at a first side of a surface of the optical touch apparatus and a second side opposite to the first side respectively, the emitting module is used for uniformly emitting a plurality of lights, the receiving module is used for receiving the plurality of lights, at least one partial area of the emitting module and/or the receiving module is composed of an optical unit with light guiding function.

16. The method of claim 10, wherein the first optical module comprises a plurality of light guiding units, the first light sensing module comprises a plurality of photoelectric sensing units, a first photoelectric sensing unit of the plurality of photoelectric sensing units corresponds to a first light guiding unit of the plurality of light guiding units and a first position, and the first photoelectric sensing unit is used for receiving a first direction light emitted from the first light guiding unit.

* * * * *